May 11, 1926.

O. A. DANIELSON

CIRCUIT CLOSER

Filed July 9, 1924

1,584,357

INVENTOR
OSCAR A. DANIELSON,
by Arthur C. Eckert ATTORNEY.

Patented May 11, 1926.

1,584,357

UNITED STATES PATENT OFFICE.

OSCAR A. DANIELSON, OF ST. LOUIS, MISSOURI.

CIRCUIT CLOSER.

Application filed July 9, 1924. Serial No. 724,942.

The object of my invention is to devise a vehicle signal that is detachably operated from the brake pedal. A further object is to produce a vehicle signal for automobiles that is controlled by the foot of the operator either by moving the foot laterally on the brake and exerting a lateral or a downward pressure.

In driving an automobile it is extremely desirable that automobiles in the front and rear be advised of the driver's intention to turn. This information must be given before the turn is made and must be specific in that it indicates a right or left turn.

Furthermore it is desirable that such signals be given without imposing unnecessary movement on the driver. The hands must be left free for steering and gear shifting. The pedal operation must be effected without moving the foot from the brake pedal. My invention embodies all these features.

Figure 1:
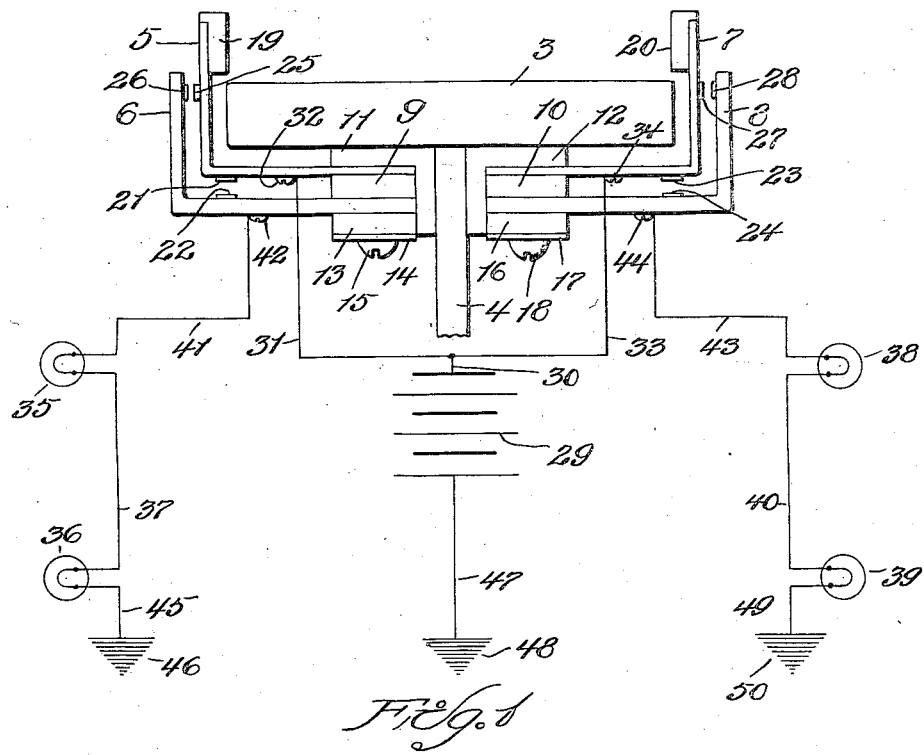
Figure 2:
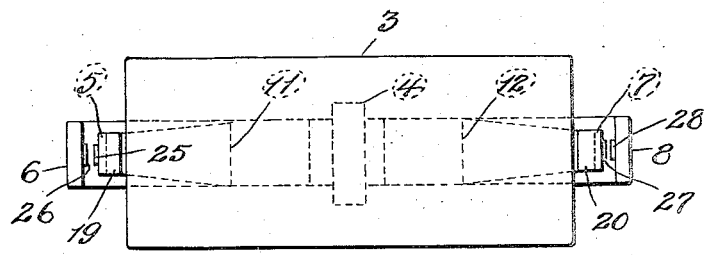

With these and other objects in view, my invention has relation to certain novel features of construction and arrangement of parts as will be hereinafter more fully described, pointed out in the claim, and illustrated in the drawings in which, Fig. 1 is a front elevation of the treadle of a brake pedal together with a fragment of the brake rod, together with a sketch of the wiring diagram and, Fig. 2 is a plan view of the treadle of the brake pedal and the brake rod.

Numeral 3 designates the brake treadle, numeral 4, the brake rod connected together in the conventional manner. Mounted on the brake rod 4, beneath the treadle 3, are the spring switches, 5, 6, 7, and 8. The spring switches, 5 and 6 are insulated from each other and from the brake rod, 4 by means of the electrical insulator, 9. The spring switches, 7 and 8 are insulated from each other and from the brake 4 by means of the electrical insulator 10. The spring switch 5 is held in spaced insulated relationship relative the brake treadle 3 by means of the insulating spacer 11. The spring switch 7 is held in spaced insulated relationship relative the brake treadle 3 by means of the insulating spacer 12. Numeral 13 designates an insulating strip secured to the lower side of spring switch 6; numeral 14 designates a metal plate secured to the insulating strips 13 at its lower side. The screw 15 passes through holes in the metal plate 14, the insulating strips 13, the spring switch 6, the electrical insulator 9, the spring switch 5, the insulating spacer 11, and is screwed into the lower face of the brake treadle 3. By this means these elements are all secured together.

Numeral 16 designates an insulating strip secured to the lower side of spring 8; numeral 17 designates a metal plate secured to the insulating strip 16 at its lower side. The screw 18 passes through holes in the metal plate 17, the insulating strips 16, the spring switch 8, the electrical insulator 10, the spring switch 7, the insulating spacer 12, and is screwed into the lower face of the brake treadle 3. By this means these elements are all secured together. The free ends of the spring switches 5 and 7 are bent at right angles around the brake treadle 3 so that they stand vertically. The free ends of the spring switches 6 and 8 are bent at right angles around the brake treadle 3 so that they stand vertically. The vertical ends of the spring switches 5 and 7 extend above the upper surface of the brake treadle 3. On these extensions are formed the foot cushion 19 on spring switch 5, and 20 on spring switch 7. On the lower horizontal surface of spring switch 5 is formed the contact 21. On the upper horizontal surface of spring switch 6, immediately beneath contact 21 is formed contact 22. On the lower horizontal surface of spring switch 7 is formed the contact 23. On the upper horizontal surface of spring switch 8, immediately beneath contact 23 is formed contact 24.

On the outer vertical surface of spring switch 5 is formed the contact 25. On the inner vertical surface of spring switch 6 and opposite contact 25 is formed the contact 26. On the outer vertical surface of spring switch 7 is formed the contact 27. On the inner vertical surface of spring switch 8 and opposite contact 27 is formed the contact 28. The switches are all shown in their normal open positions in Fig. 1. The operator's foot rests normally on the brake treadle 3 between the foot cushions 19 and 20. If the operator's foot is moved to the left the contacts 25 and 26 are brought into electrical engagement. If the operator's foot is moved to the right, the contacts 27 and 28 are brought into electrical engagement. If the operator's foot is placed on top of the foot cushion 19 the contacts 21 and 22 will be brought into electrical engagement. If the operator's foot is placed on top of the foot cushion 20, the contacts 23 and 24 will be brought into electrical engagement.

The electrical connections are the following:

Numeral 29 designates a source of current such as a battery. By means of the wires 30 and 31, one of the battery terminals is connected electrically with the spring switch 5. A terminal screw 32 is provided on the spring switch 5 for making the wire connection. By means of the wires 30 and 33, the same battery terminal is connected to the spring switch 7. A terminal screw 34 is provided on the spring switch 7 for making the wire connection. Numerals 35 and 36 designate two signal lamps positioned on the left side of the car, connected in series by the wire 37. Numerals 38 and 39 designate two signal lamps positioned on the right side of the car, connected in series by the wire 40. By means of the wire 41, lamp 35 is connected to spring switch 6. A terminal screw 42 is provided on the spring switch 6 for making the wire connection. By means of the wire 43, lamp 38 is connected to spring switch 8. A terminal screw 44 is provided on the spring switch 8 for making the wire connection. By means of the wire 45, the lamp 36 is grounded on to the metallic car frame at 46. By means of the wire 47, the battery 29 is grounded on to the metallic car frame at 48. By means of the wire 49, the lamp 39 is grounded on to the metallic car frame at 50.

When the driver desires to signal to vehicles in the front and rear that he will turn to the left, he moves his foot to the left exerting a slight pressure on the foot cushion 19, thereby bringing contacts 25 and 26 into electrical engagement or he may place his foot on the top of the foot cushion 19 and exert a slight downward pressure, bringing the contacts 21 and 22 into electrical engagement. In either event the effect is the same, namely, the spring switches 5 and 6 are brought into electrical contact. When this is done the current passes from the battery 29, through wires 30 and 31, through spring switches 5 and 6 and wire 41 to the light 35, thence through wire 37 to light 36, thence through wire 45 to the frame at the ground 46, thence through the frame to the ground at 48, thence through the wire 47 back to the battery. When this current is closed the lamps 35 and 36 both burn. When the driver desires to signal to vehicles in the front and rear that he will turn to the right he moves his foot to the right, exerting a slight pressure on the foot cushion 20, thereby bringing contacts 27 and 28 into electrical engagement, or he may place his foot on the top of the foot cushion 20 and exert a slight downward pressure, bringing the contacts 23 and 24 into electrical engagement. In either event the effect is the same, that is, the spring switches 7 and 8 are brought into electrical contact. When this is done the current passes from the battery 29, through wires 30 and 33, through spring switches 7 and 8 and wire 43 to the light 38, thence through the wire 40 to the light 39, thence through wire 49 to the frame at the ground 50, thence through the frame to the ground at 48, thence through the wire 47 back to the battery.

What I claim and mean to secure by Letters Patent is,

A circuit breaker comprising a treadle, a treadle rod, said treadle secured to said treadle rod, insulators secured to said treadle rod, spring switches secured to said insulators in spaced relationship, being positioned beneath and laterally relative said treadle and in spaced relationship with said treadle, contacts formed on the horizontal and vertical arms of said spring switches opposite each other and in spaced relationship with each other.

In testimony whereof I affix my signature.

OSCAR A. DANIELSON.